INVENTOR.
ROGER F. MARSH
BY
Christie, Parker & Hale
ATTORNEYS.

INVENTOR.
ROGER F. MARSH
BY
Christie, Parker & Hale
ATTORNEYS

INVENTOR.
ROGER F. MARSH
BY
Christie, Parker & Hale
ATTORNEYS.

INVENTOR.
ROGER F. MARSH
BY
Christie, Parker & Hale
ATTORNEYS.

United States Patent Office 3,449,695

Patented June 10, 1969

3,449,695

VOLTAGE TO FREQUENCY CONVERTER INCLUDING A FEEDBACK CONTROL CIRCUIT

Roger F. Marsh, Arcadia, Calif., assignor to Consolidated Electrodynamics Corporation, Pasadena, Calif., a corporation of California Filed Oct. 9, 1964, Ser. No. 402,876
Int. Cl. H03b *3/04;* H03k *3/04;* H04l *3/00*
U.S. Cl. 332—9 12 Claims

ABSTRACT OF THE DISCLOSURE

A voltage to frequency converter utilizing an integrating amplifier, a trigger circuit and a pair of switches in serial connection. One of the switches is connected to an output terminal from the converter and the second of the switches is connected by means of a feedback connection to the integrating amplifier to periodically reset the amplifier each time a pulse is produced at the output terminal. The frequency of pulses from the output terminal is directly proportional to the analog signal presented at an input terminal to the converter.

This invention relates to a device for analog to digital conversion and in particular to a device which converts a voltage or current to electrical pulses.

Circuits and devices for transmuting analog signals into digital signals and for integrating the area under the peaks of time varying signals find wide application. In aerospace applications the output of transducers and other measuring devices must be conditioned for telemetry transmission. Likewise it is often valuable to be able to read the quantitative amount of one or more components present in a gas or liquid stream. Analog to digital converters are normally used as one component of the means for accomplishing these objectives. These converters can take a number of different forms, some making extensive use of electromechanical means such as relays, etc. Typical of this type of circuit is U.S. Patent 3,059,223. Other converts are completely electronic.

A particular variety of electronic analog-digital converter is characterized by one common feature. This feature is the periodic charging and discharging of a capacitor when a signal is presented to the converter in order to generate a pulsing output. By proper design of the circuit, the frequency of these pulses can be made directly proportional to the analog signal introduced at the input. Prior art devices for accomplishing the discharge of the capacitor have employed costly and complex pulse forming circuits. These circuits acted to remove the charge on the capacitor by shorting directly across it. Such circuits are costly because they must be designed so that they have infinite impedance while the capacitor is being charged. If such a design requirement is not achieved, the device becomes non-linear especially at lower frequencies and the input and output are no longer directly proportional.

The present invention contemplates an electronic analog to digital converter comprising a ramp function generator in a first stage which is connected to a regenerative bi-stable circuit in a second stage. The regenerative circuit is in turn connected to a third stage comprising a switching means operable in response to a change of state of the regenerative circuit. The switching means restarts the ramp function generator when the regenerative circuit changes state and generates a pulse of a predetermined duration each time the generator is restarted.

In the present converter the problems inherent in shorting directly across the capacitor are avoided and instead a method of discharging the capacitor is used wherein the output side of the capacitor is periodically connected to the circuit ground or common terminal. By maintaining the input side of the capacitor at ground potential by means of a clamping diode the charge which has been built up on the capacitor is immediately discharged when the output side is connected to this common point. In a preferred form of the invention the output side of the capacitor is shorted to ground by means of a transistor switch which is rendered conductive in response to a change of state of a Schmitt trigger circuit.

By substituting this design for the pulse forming circuit of the prior art there is a substantial improvement in the economy of the device without any sacrifice of linearity or dynamic range. An added advantage is that this circuit can be made temperature insensitive, while those in the prior art are normally affected by temperature changes.

These and other details of the invention will be understood by reference to the following figures in which.

Figure 1:
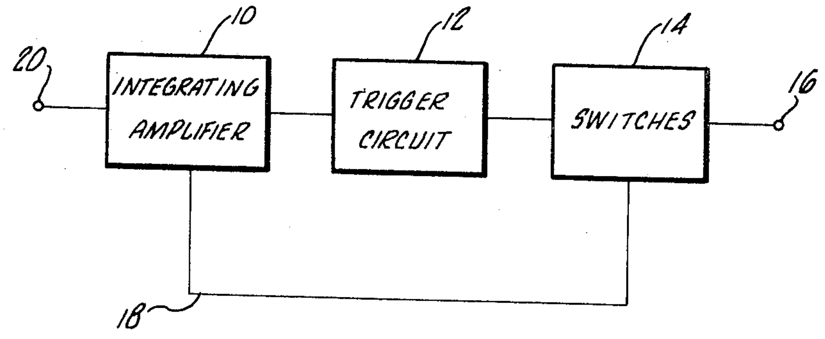
FIG. 1 is a block diagram of the three stages of the circuit of this invention.

As depicted in FIG. 1 the invention includes an integrating amplifier 10 connected to a trigger circuit 12 which is in turn connected to switching means 14. The trigger circuit is preferably a transistorized Schmitt trigger arranged such that its first transistor is normally conducting and the second, non-conducting. The integrating amplifier is preferably a combination of an operational amplifier and a feedback capacitor. The switching means are connected to an output terminal 16 and by means of a connection 18 to the integrating amplifier 10.

Figure 3:
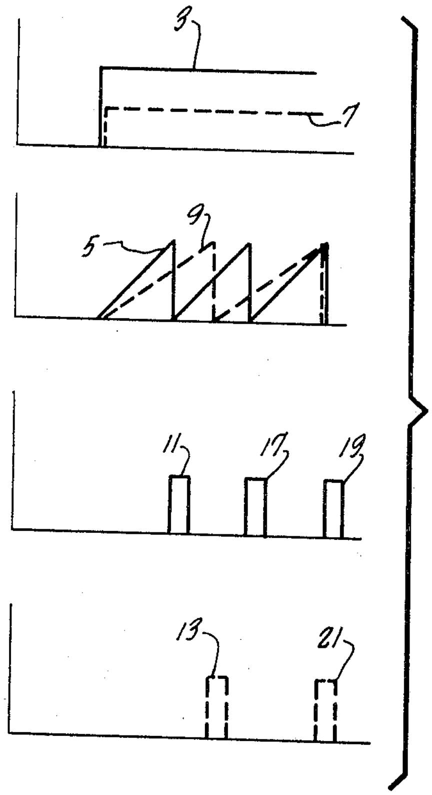
FIG. 3 is a series of waveforms representing the output from various stages in the circuit.

FIG. 3 illustrates waveforms at certain points in the circuit during operation. When a signal 3 is encountered at the input terminal 20 it is accepted by the amplifier 10 which in turn generates a ramp function 5 at its output. The slope of the ramp is proportional to the amplitude of the signal applied to the input terminal 20. When a signal 7 of lesser amplitude is encountered the slope of the ramp function 9 is correspondingly decreased. Thus depending on the amplitude of the voltage the slope of the ramp function will increase as the amplitude of the the voltage applied at the input terminal increases. The ramp function is applied to the trigger circuit 12 and when it reaches a certain amplitude it causes the trigger to "fire" or change state.

This change of state has the following effect. The second transistor in the trigger now conducts while the first is rendered non-conductive. When the second transistor conducts, a signal is presented to the switching means 14 causing it to operate. The switching means performs two distinct functions and as shown in more detail in conjunction with the description of FIG. 2 utilizes two distinct switching elements, preferably transistors. The first switching element is connected to the feedback capacitor associated with the integrating amplifier and when this switch is operated it connects the output side of the capacitor to a common or ground point in the circuit. At the same time the second switch also operates and this change of state generates an output pulse 11 at terminal 16. The effect of discharging the capacitor is to restart the integrating amplifier and the operating cycle begins again. The generator output again builds up until it achieves a certain threshold voltage at which time the trigger and switching means are caused to operate again, generating pulse 17. As long as there is an input signal present at terminal 20, a pulsing output is generated at terminal 16, the frequency of pulses 11, 17, 19 and 13, 21 respectively being directly proportional to the amplitude of the signal applied to the input terminal. The amplitude and duration of the pulses are determined by the specific value of the circuit parameters used. In this way an analog signal applied to the input terminal is converted by means of a combination of integrating amplifier, a trigger circuit and switching means into a repetitive digital signal whose periodicity is proportional to the analog signal. This digital signal can be used to modulate the radio carrier for telemetry applications, to operate pulse counting circuits in analytical instruments, in digital voltmeters, laboratory integrators and in frequency meters.

The performance circuits of this invention compares favorably with voltage-frequency converters available in the prior art. For example, characteristics such as dynamic range are as good or better than anything heretofore known. The dynamic range of this circuit is approximately $10^4$. This means that for a center frequency of 1,000 cycles per second the converter is capable of generating pulse frequencies as low as 10 cycles per second and as high as 100,000 cycles per second.

Figure 2:
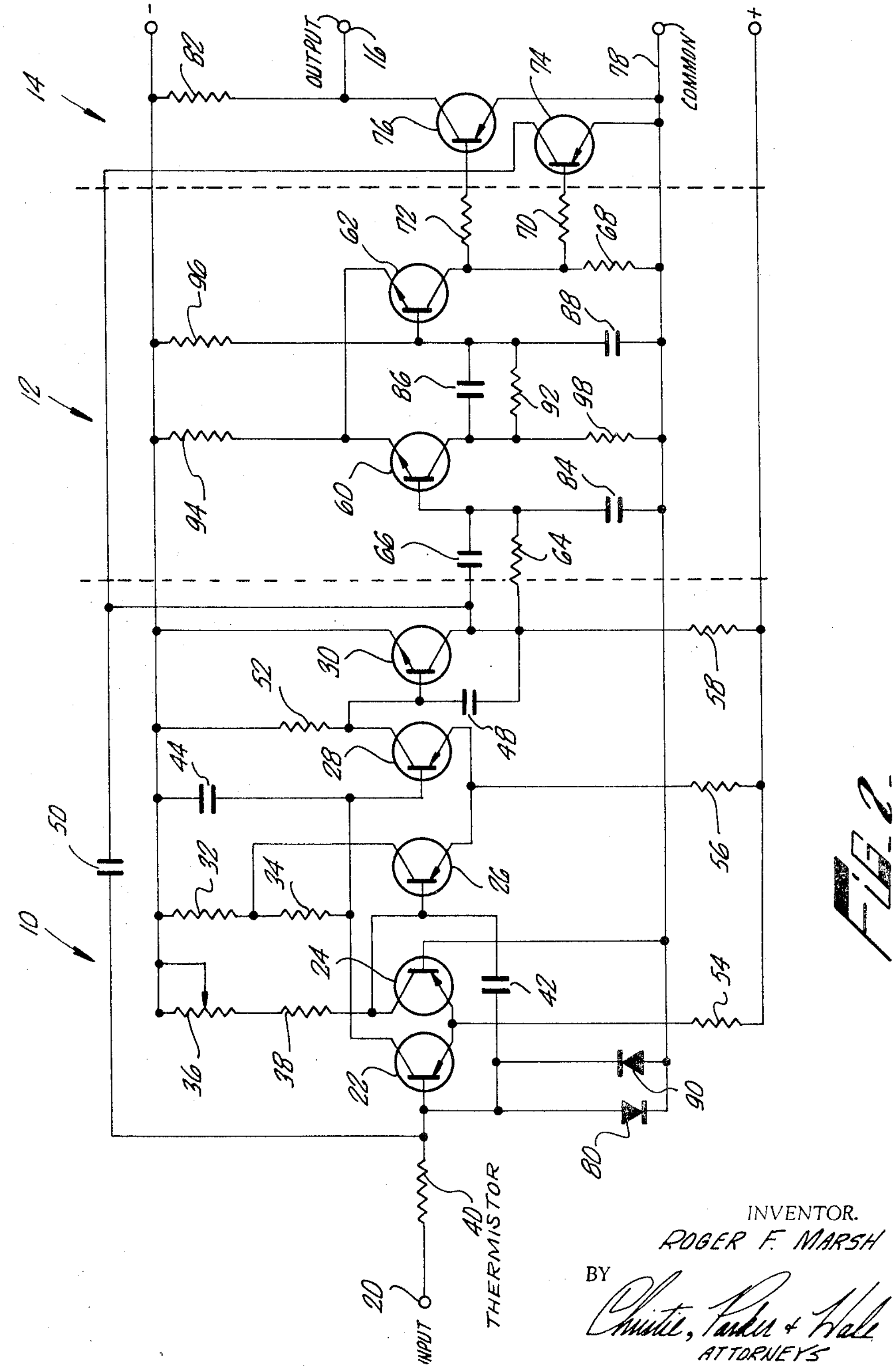
FIG. 2 is a schematic diagram of the circuit which is depicted in block form in FIG. 1.

Referring now to FIG. 2, there is shown in schematic form the circuit details of the converter of this invention. In FIG. 2 transistors 22, 24, 26, 28 and 30 comprise a DC amplifier with an open loop gain of approximately 100,000. Transistors 22 and 24 comprise a differential input stage to the amplifier which operates at moderately low collector currents. This provides the amplifier with high input impedance, minimal drift and good current gain. The current gain is further improved by providing a conservative amount of positive feedback by means of feedback resistors 32 and 34. Resistors 36 and 38 jointly serve as a balance control for setting the zero of the amplifier. Resistor 40 is preferably a thermistor whereby the circuit is made insensitive to temperature variations.

Transistors 26 and 28 comprise a second differential amplifier in which the operating parameters are selected so as to minimize drift. The single ended output of this second stage drives transistor 30, a class A voltage amplifier output stage. Capacitors 42, 44 and 48 are employed as blocking capacitors to prevent oscillation and ringing of the circuit.

By means of capacitor 50 a negative feedback path from the output to the input of the amplifier is established. The combination of capacitor 50 and the DC amplifier in conjunction with it acts to integrate the input voltage applied to terminal 20 through thermistor 40. When a signal is applied at terminal 20, the voltage at the output of the amplifier rises at a rate proportional to the amount of voltage applied at the input. The rate of rise for a given input voltage is determined by the time constant of capacitor 50 and thermistor 40. Resistors 52, 54, 56 and 58 are respectively biasing resistors for obtaining the proper operating parameters for the various transistors to which they are connected.

Transistors 60 and 62 and attendant circuitry form a Schmitt trigger circuit in which transistor 60 is normally conducting and transistor 62, normally non-conducting. The output of the integrator circuit is connected to the Schmitt trigger at the base electrode of transistor 60 through resistor 64 and capacitor 66. Capacitor 66 blocks DC signals while resistor 64 limits the amount of current transmitted to the base of transistor 60.

In operation the ramp function output of the integrating amplifier rises to a certain amplitude and raises the voltage on the base of transistor 60 to a level equal to the voltage on the emitter of this transistor. When this condition occurs transistor 62 conducts causing the common emitter voltage between the two transistors to drop, and transistor 60 is immediately rendered non-conductive. At the instant when transistor 62 begins to conduct, a voltage drop occurs across resistor 68 which causes a change of voltage at the collector of transistor 62. This change of voltage is fed through current limiting resistors 70 and 72 to the bases of transistors 74 and 76 causing both of these transistors to conduct to common or ground potential at the common terminal 78. When this occurs the output side of capacitor 50 is effectively placed at the potential of that terminal. Since the input side of capacitor 50 is continually clamped to the potential of the common terminal 78 by diode 80 the charge on capacitor 50 is removed by the conduction of transistor 74. Simultaneous with the discharge of capacitor 50, the conduction of transistor 76 provides a pulse at output terminal 16 due to the voltage drop across resistor 82 during the interval that the transistor conducts.

As soon as the charge is removed from capacitor 50, transistor 60 begins to conduct again causing transistors 62, 74 and 76 to cease conduction and the cycle is completed. Capacitors 84, 86 and 88 are provided in the circuit in order to insure positive firing of the Schmitt trigger. Diode 90 is provided to protect transistor 22 in the event that a negative voltage is applied at the input terminal 20.

Resistor 92 like resistor 64 serves to limit the current to the second transistor of the Schmitt trigger, transistor 62. Finally, resistors 94 and 96 have the function of biasing the two transistors of the Schmitt trigger to the proper operating condition. As indicated the Schmitt trigger forms the second stage 12 of this three-stage device while transistors 74 and 76 comprise what has been referred to throughout as the third stage 14.

As expected with solid state devices both of these means of connecting the capacitor to ground (i.e., the transistor switch and clamping diode) have leakage currents associated with them. However, the linearity of the device is not adversely affected due to the fact that the operational amplifier which is part of the first stage of the circuit of this invention has an output impedance which is very low and an output current which is relatively high. Since the leakage current of the transistor switch is relatively small the effect of this current is negligible in comparison with the large output current from the amplifier. Furthermore, since the impedance at the input side of the amplifier is nearly zero the current values at this point are also relatively high and the leakage of the clamping diode is likewise negligible relative to it.

As shown, the circuit is designed for a positive input signal and provides a positive pulse at the output. If a negative input signal and a negative output pulse are desired then the PNP transistors which are used as indicated are replaced with NPN types and likewise the NPN transistors replaced with PNP types. Further, the polarities of the various power supplies are also reversed.

By suitable modification of the circuit of the invention, this device can be converted from an analog to digital converter to a function generator capable of generating, for example, a square wave, a triangular wave and pulses of extremely short duration. Other modifications for obtaining other functions in addition to those just enumerated will be obvious to those skilled in the art.

Figure 4:
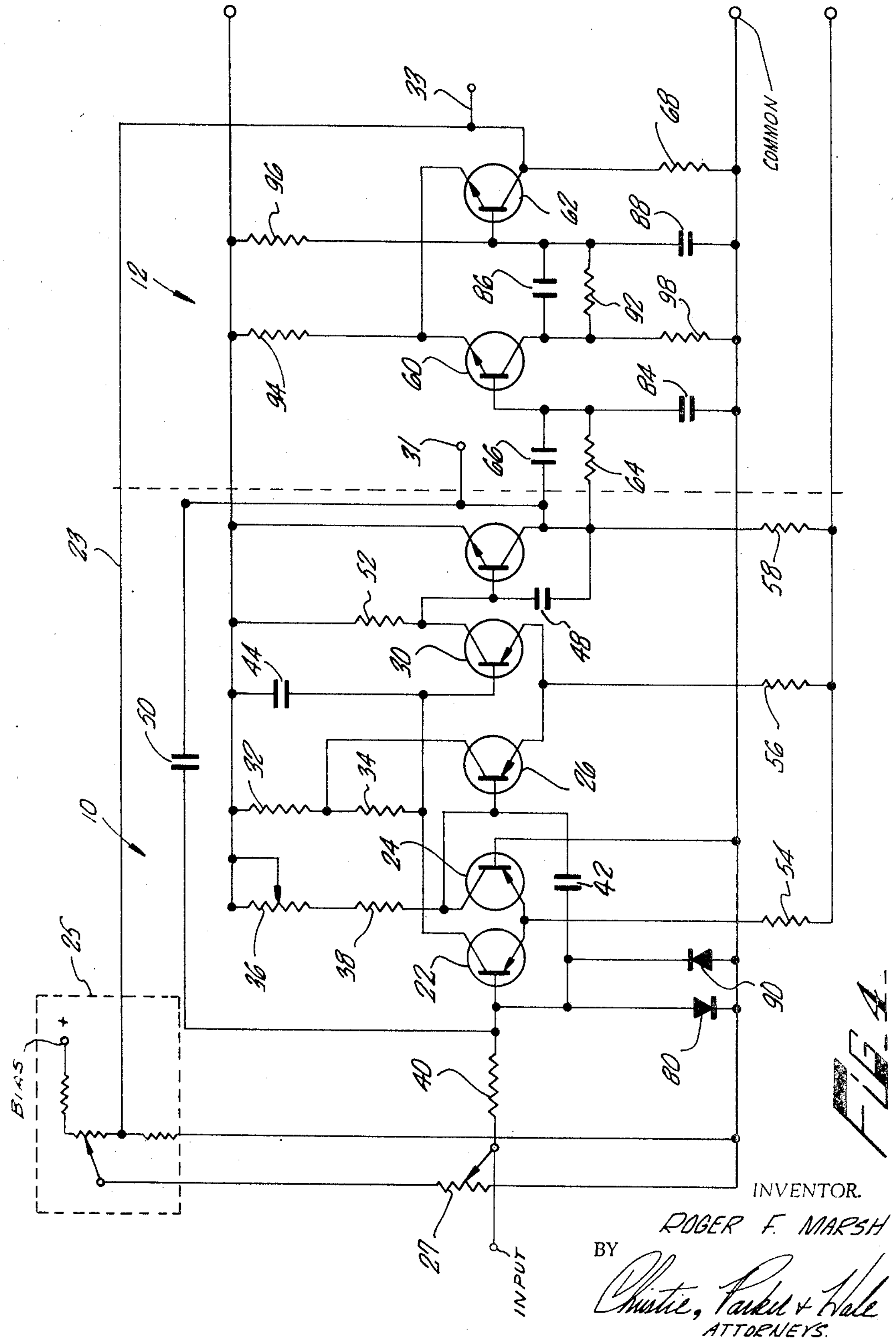
FIG. 4 is a schematic diagram of the circuit of FIG. 2 showing the modifications necessary to convert the device into a function generator.

Referring to FIG. 4 the following modification of the circuit of FIG. 2 makes possible the conversion of the circuit to a function generator capable of generating a square wave and a triangular wave depending on the circuit location from which the output is taken. A feedback connection 23 from the collector of transistor 62 of the trigger circuit 12 to the input of the integrating amplifier 10 is provided. A bias or bucking voltage supply 25 connected in the feedback connection 23 is provided whereby the polarity of the voltage fed back to the integrating amplifier is positive when the trigger is in its first state and is negative when the trigger is in its second state. The effect of this alternating feedback signal is to cause the integrating amplifier 10 to generate a ramp function with a positive slope until the threshold voltage of the trigger 12 is reached and a ramp function of negative slope during the interval when the trigger circuit is switched to its second state. An output taken at point 31 in the circuit is a triangular wave. At the same time an output taken at the collector 33 of transistor 62 of the trigger 12 is a square wave.

The frequency of these signals is controlled by providing an attenuator 27 in feedback connection 23 to the integrating amplifier. By varying the amplitude of the square wave with the attenuator 27, the frequency of the output signals are varied.

Figure 5:
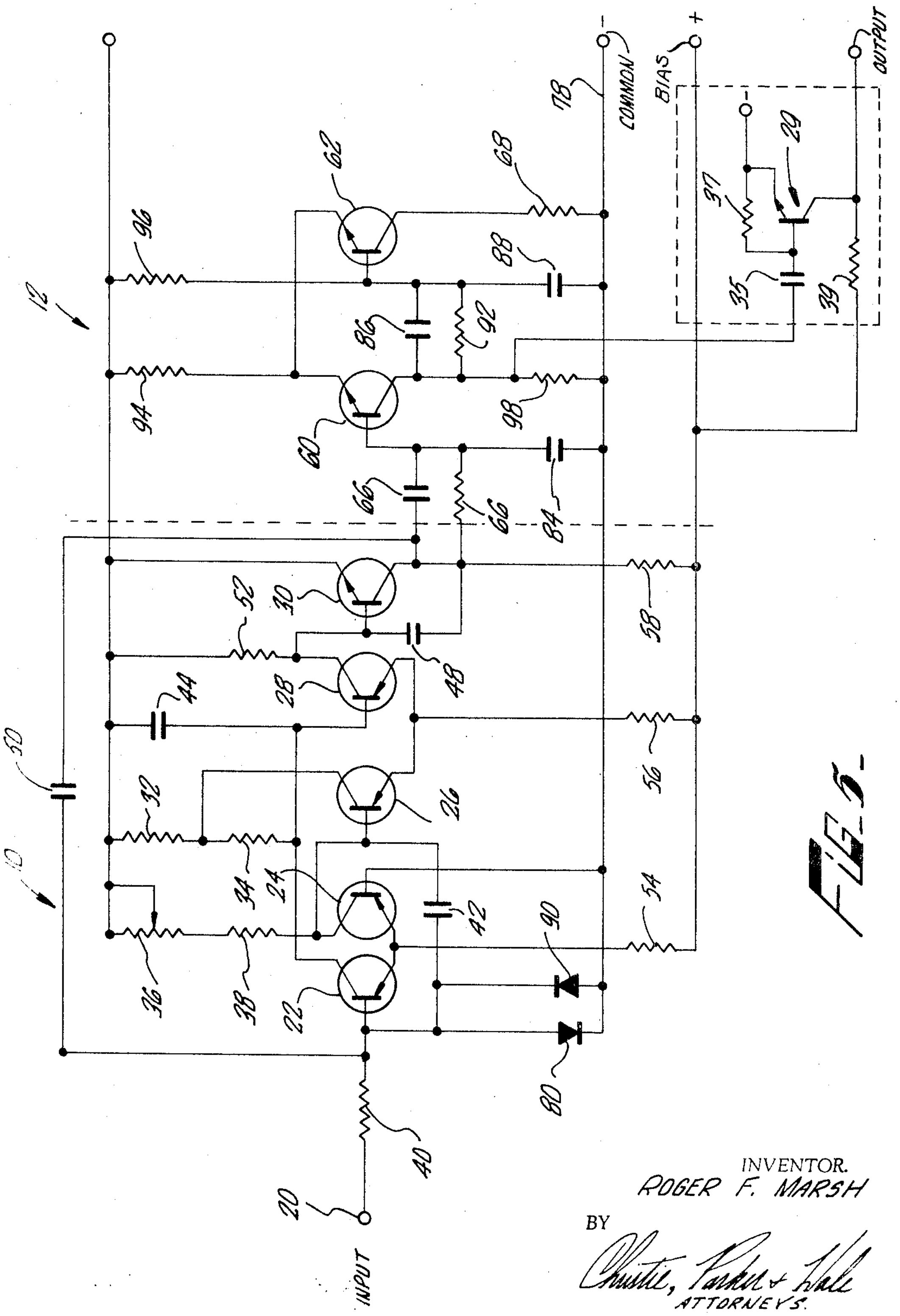
FIG. 5 is a schematic of the circuit of FIG. 2 modified to produce a pulse generator.

To modify the circuit of FIG. 2 to produce pulses of extremely short duration (on the order of 1 microsecond) a small capacitor 35 (100 micromicrofarads or less) is connected between the collector of transistor 60 and the base of transistor 29 as shown in FIG. 5. A resistor 37 is connected between the base and emitter of transistor 29 and to the negative battery supply. A resistor 39 is connected between the positive battery supply and the collector of transistor 29. The output taken from the collector of transistor 29 is the short duration pulse.

I claim:

1. An electronic analog to digital converter comprising a ramp function generator in a first stage, a regenerative bi-stable circuit in a second stage connected to the generator, a third stage connected to the regenerative circuit comprising a pair of switching means responsive to a change of state of the regenerative circuit, and a feedback connection between the first switching means and the function generator for periodically restarting the generator, the second switching means being connected so as to generate a pulse each time the generator is restarted.

2. An electronic analog to digital converter comprising a ramp function generator in a first stage, a trigger circuit in a second stage connected to the generator, a third stage connected to the trigger circuit comprising a pair of switching means, and a feedback connection between the first switching means and the function generator for periodically restarting the generator, the second switching means being connected so as to generate a pulse each time the generator is restarted.

3. An electronic analog to digital converter comprising an input terminal connected to a ramp function generator in a first stage, a trigger circuit in a second stage connected to the generator, a third stage comprising a pair of switching means, the third stage being connected by a feedback connection to the generator and to an output terminal whereby when an analog signal is presented at the input terminal the generator output causes the trigger circuit to change state thereby operating a first one of the switching means to cause the generator to be restarted and operating the second of the switching means to generate a pulse at the output terminal each time the generator is restarted.

4. A voltage to frequency converter comprising an input terminal connected to an integrating means comprising the combination of a DC amplifier and a capacitor in a negative feedback circuit in a first stage, a Schmitt trigger circuit in a second stage connected to the integrating means, and a third stage connected between the trigger circuit and an output terminal, the third stage comprising a pair of transistor switches, the first switch being connected to the feedback capacitor and the second switch being connected to the output terminal whereby when a voltage is present at the input terminal the first transistor switch periodically discharges the feedback capacitor and the second transistor switch generates a pulse at the output terminal each time the capacitor is discharged, the frequency of the pulses being proportional to the amplitude of the voltage at the input terminal.

5. A voltage to frequency converter according to claim 4 wherein the input side of the capacitor in the feedback circuit of the integrating means is continuously connected to a reference potential point in the circuit by means of a clamping diode and the output side of the capacitor is connected to the reference potential point by means of the first transistor switch.

6. An analog to digital converter comprising an input terminal connected to an integrating amplifier in a first stage, a trigger circuit in a second stage connected to the amplifier, and a pair of switches in a third stage, a first one of the switches being connected to the amplifier by a feedback connection and the second of the switches being connected to an output terminal whereby when an analog signal is present at the input terminal the first switch periodically recycles the amplifier and the second switch generates a pulse at the output terminal each time the generator is recycled.

7. A voltage to frequency converter comprising an input terminal connected to an integrating amplifier in a first stage, a two-state trigger circuit in a second stage connected to the amplifier, and a pair of switches in a third stage, a first one of the switches being connected to the amplifier by a feedback connection and the second of the switches being connected to an output terminal whereby when a voltage is present at the input terminal, the pair of switches are caused to operate periodically, the first switch for recycling the amplifier and the second switch for generating a pulse at the output terminal each time the generator is recycled.

8. In an analog to digital converter having an input terminal connected to an integrating circuit comprising the combination of a DC amplifier and a capacitor in a feedback circuit from the output of the converter to the input of the amplifier in a first stage, the improvement comprising a trigger circuit in a second stage connected to the amplifier and a third stage connected to the trigger circuit comprising a pair of switching means, the first switching means being connected in the feedback circuit to the capacitor of the integrating circuit, the second switching means being also connected to an output terminal.

9. In a voltage to frequency converter having an input terminal connected to an integrating circuit comprising a DC amplifier and a capacitor in a feedback circuit from the output to the input of the amplifier in a first stage, the improvement comprising a Schmitt trigger circuit in a second stage connected to the amplifier and a third stage connected to the trigger circuit comprising a pair of transistor switches, the first transistor switch being also connected to the feedback capacitor for periodically discharging the capacitor in response to operation of the trigger circuit, the second transistor being also connected to an output terminal of the converter for generating a pulse at the output terminal for each discharge of the capacitor.

10. A function generator comprising an integrating circuit connected to a two-state trigger circuit, a feedback connection from the output of the trigger circuit to the input to the integrating circuit and a bias voltage supply in said feedback connection whereby when the trigger circuit is in a first state the signal from the trigger fed back to the integrating circuit has a first polarity and when the trigger circuit is in a second state, the signal fed back has a second polarity thereby causing, the signal at the output from the integrating circuit to have a triangular wave shape and the signal at the output from the trigger circuit to have a square wave shape.

11. A function generator according to claim 10 having an attenuator connected in series in the feedback connection whereby the frequency of the function produced by the generator is dependent on the amount of attenuation introduced by the attenuator in the feedback connection.

12. A pulse generator comprising an integrating circuit connected to a two-state trigger circuit, the trigger circuit having a feedback connection from the output of the trigger circuit to the input to the integrating circuit and being comprised of two transistors, one arranged in a normally conductive condition, the second in a normally non-conductive condition, a pulse generating circuit including a normally nonconducting transistor and a capacitor connected between the collector of the normally conductive transistor of the trigger circuit and the base of the transistor of the pulse generating circuit whereby when a signal is presented to the input to the generator the signal at the collector of the pulse generating circuit transistor is a short duration pulse, repetitively generated while the signal is present at the input to the generator and having a frequency dependent on the amplitude of the input signal.

References Cited

UNITED STATES PATENTS

| | | | |
|---|---|---|---|
| 2,885,662 | 5/1959 | Hansen | 332—9 X |
| 3,022,469 | 2/1962 | Bahrs et al. | 332—14 |
| 3,064,208 | 11/1962 | Bullock et al. | 329—107 X |
| 3,262,069 | 7/1966 | Stella | 331—61 X |

ALFRED L. BRODY, *Primary Examiner.*

U.S. Cl. X.R.

307—261, 271; 328—59, 66, 185; 329—107; 332—1, 14, 19; 304—347